US010326700B1

(12) United States Patent
Koenning

(10) Patent No.: US 10,326,700 B1
(45) Date of Patent: Jun. 18, 2019

(54) HASH BASED PER SUBSCRIBER DNS BASED TRAFFIC CLASSIFICATION

(71) Applicant: F5 Networks, Inc., Seattle, WA (US)

(72) Inventor: Christian Josef Koenning, Englefield Green (GB)

(73) Assignee: F5 Networks, Inc., Seattle, WA (US)

( * ) Notice: Subject to any disclaimer, the term of this patent is extended or adjusted under 35 U.S.C. 154(b) by 90 days.

(21) Appl. No.: 15/472,969

(22) Filed: Mar. 29, 2017

Related U.S. Application Data

(60) Provisional application No. 62/314,923, filed on Mar. 29, 2016.

(51) Int. Cl.
| | | |
|---|---|---|
| *H04L 29/12* | (2006.01) | |
| *H04L 12/721* | (2013.01) | |
| *H04L 12/743* | (2013.01) | |
| *H04L 12/813* | (2013.01) | |
| *H04L 12/851* | (2013.01) | |

(52) U.S. Cl.
CPC .............. *H04L 47/20* (2013.01); *H04L 45/72* (2013.01); *H04L 45/7453* (2013.01);
(Continued)

(58) Field of Classification Search
CPC ... H04L 45/72; H04L 45/7453; H04L 47/125; H04L 47/20; H04L 47/2425;
(Continued)

(56) References Cited

U.S. PATENT DOCUMENTS 7,222,175 B2 * 5/2007 Knauerhase .......... H04W 16/06
709/225
7,382,757 B2 * 6/2008 LoGalbo ............... H04W 88/08
370/338
(Continued)

FOREIGN PATENT DOCUMENTS

| EP | 3166265 A1 * | 5/2017 | ............. H04L 45/38 |
| EP | 3166265 A4 * | 8/2017 | ............. H04L 45/38 |

OTHER PUBLICATIONS

International Search Report and Written Opinion for International Application No. PCT/US2016/067370 dated Apr. 3, 2017, 12 pages.
(Continued)

*Primary Examiner* — Eric Nowlin
(74) *Attorney, Agent, or Firm* — John W. Branch; Lowe Graham Jones PLLC

(57) ABSTRACT

Embodiments are directed towards managing name service communications using traffic management computers (TMCs). TMCs may extract values from a name service reply received from one or more name service computers. TMCs may provide a name service key based on the values extracted from the name service reply. Accordingly, if a new flow may be detected further actions may be performed, including: TMCs may extract values from a network packet associated with the new flow; TMCs may provide a flow key based on one or more values from one or more fields of a network packet associated with the new flow; TMCs may compare the flow key to one or more name service keys; and if the comparison may be affirmative, TMCs may apply one or more traffic management policies associated with the affirmative comparison.

18 Claims, 12 Drawing Sheets

(52) U.S. Cl.
CPC ...... *H04L 47/2425* (2013.01); *H04L 47/2441* (2013.01); *H04L 61/1511* (2013.01)

(58) Field of Classification Search
CPC ............. H04L 47/2441; H04L 61/1511; H04L 61/2007; H04L 63/1416
See application file for complete search history.

(56) References Cited

U.S. PATENT DOCUMENTS

| | | | | |
|---|---|---|---|---|
| 7,616,617 | B2* | 11/2009 | Pandey | H04W 48/12 370/328 |
| 7,706,337 | B2* | 4/2010 | Pandey | H04W 40/246 370/328 |
| 7,920,545 | B2* | 4/2011 | Eguchi | H04W 56/00 370/350 |
| 8,144,670 | B2* | 3/2012 | Shin | H04W 72/0406 370/229 |
| 8,149,794 | B2* | 4/2012 | Shin | H04W 72/0413 370/336 |
| 8,223,662 | B2* | 7/2012 | Deshpande | H04W 52/0216 370/252 |
| 8,305,946 | B2* | 11/2012 | Kubo | H04L 12/12 370/311 |
| 8,694,642 | B2* | 4/2014 | Dempsky | H04L 61/6013 709/226 |
| 8,726,375 | B2* | 5/2014 | Ma | H04L 29/12066 709/224 |
| 8,804,590 | B2* | 8/2014 | Nakae | H04W 48/12 370/311 |
| 8,830,986 | B2* | 9/2014 | Sakoda | H04W 48/08 370/350 |
| 8,966,122 | B2* | 2/2015 | Treuhaft | H04L 61/1511 709/245 |
| 9,160,702 | B2* | 10/2015 | Dempsky | H04L 61/6013 |
| 9,204,368 | B2* | 12/2015 | Chen | H04W 74/0816 |
| 9,210,656 | B2* | 12/2015 | Mannemala | H04W 52/0216 |
| 9,265,044 | B2* | 2/2016 | Sakoda | H04W 48/08 |
| 9,282,511 | B2* | 3/2016 | Kim | H04W 52/0216 |
| 9,282,515 | B2* | 3/2016 | Joo | H04W 52/0216 |
| 9,292,864 | B2* | 3/2016 | Qi | G06Q 30/0267 |
| 9,413,714 | B2* | 8/2016 | Treuhaft | H04L 61/1511 |
| 9,419,999 | B2* | 8/2016 | Ma | H04L 29/12066 |
| 9,628,437 | B2* | 4/2017 | Dempsky | H04L 61/6013 |
| 9,900,826 | B2* | 2/2018 | Amini | H04W 40/244 |
| 9,913,219 | B2* | 3/2018 | Gong | G06F 1/3209 |
| 9,923,961 | B2* | 3/2018 | Hentunen | H04L 67/1036 |
| 9,930,693 | B2* | 3/2018 | Lee | H04W 72/0446 |
| 2003/0163579 | A1* | 8/2003 | Knauerhase | H04W 16/06 709/230 |
| 2003/0189932 | A1* | 10/2003 | Ishikawa | H04L 47/10 370/392 |
| 2006/0089964 | A1* | 4/2006 | Pandey | H04W 40/246 709/203 |
| 2006/0251017 | A1* | 11/2006 | Bishop | H04B 7/2693 370/330 |
| 2007/0280184 | A1* | 12/2007 | Shin | H04W 72/0413 370/338 |
| 2007/0280237 | A1* | 12/2007 | Shin | H04W 72/0406 370/390 |
| 2008/0002633 | A1* | 1/2008 | Pandey | H04W 48/12 370/338 |
| 2009/0089441 | A1 | 4/2009 | Taylor et al. | |
| 2010/0031362 | A1 | 2/2010 | Himberger et al. | |
| 2010/0157955 | A1* | 6/2010 | Liu | H04W 72/0446 370/336 |
| 2010/0332680 | A1 | 12/2010 | Anderson et al. | |
| 2011/0231931 | A1* | 9/2011 | Ma | H04L 29/12066 726/22 |
| 2012/0127965 | A1* | 5/2012 | Benveniste | H04L 47/14 370/336 |
| 2012/0158969 | A1* | 6/2012 | Dempsky | H04L 61/6013 709/226 |
| 2012/0307702 | A1* | 12/2012 | Nakae | H04W 48/12 370/311 |
| 2013/0013739 | A1 | 1/2013 | Grimault et al. | |
| 2013/0070582 | A1* | 3/2013 | Joo | H04W 52/0216 370/216 |
| 2013/0219035 | A1* | 8/2013 | Detienne | H04L 9/0833 709/223 |
| 2013/0250832 | A1* | 9/2013 | Kim | H04W 52/0216 370/311 |
| 2013/0275570 | A1* | 10/2013 | Treuhaft | H04L 61/1511 709/223 |
| 2013/0287010 | A1* | 10/2013 | Chen | H04W 48/10 370/338 |
| 2013/0346207 | A1* | 12/2013 | Qi | G06Q 30/0267 705/14.64 |
| 2014/0036746 | A1* | 2/2014 | Mannemala | H04W 52/0216 370/311 |
| 2014/0036887 | A1* | 2/2014 | Sakoda | H04W 48/08 370/336 |
| 2014/0150051 | A1 | 5/2014 | Bharali et al. | |
| 2014/0195692 | A1* | 7/2014 | Treuhaft | H04L 29/12066 709/229 |
| 2014/0208423 | A1* | 7/2014 | Ma | H04L 29/12066 726/22 |
| 2014/0215092 | A1* | 7/2014 | Dempsky | H04L 61/6013 709/245 |
| 2015/0081474 | A1* | 3/2015 | Kostka | H04W 4/21 705/26.8 |
| 2015/0127802 | A1* | 5/2015 | Treuhaft | H04L 61/1511 709/223 |
| 2015/0163828 | A1* | 6/2015 | Vandwalle | H04W 52/383 370/330 |
| 2015/0215819 | A1* | 7/2015 | Bosch | H04W 24/02 370/221 |
| 2015/0256508 | A1* | 9/2015 | Townsend | H04L 61/20 709/245 |
| 2016/0021615 | A1* | 1/2016 | Gong | G06F 1/3209 370/311 |
| 2016/0036763 | A1* | 2/2016 | Dempsky | H04L 61/6013 709/245 |
| 2016/0150004 | A1* | 5/2016 | Hentunen | H04L 67/1036 726/23 |
| 2016/0234807 | A1* | 8/2016 | Levy | H04W 56/00 |
| 2016/0269971 | A1* | 9/2016 | Kim | H04W 16/14 |
| 2016/0286485 | A1* | 9/2016 | Li | H04W 52/0216 |
| 2016/0309393 | A1* | 10/2016 | Amini | H04W 40/244 |
| 2017/0046237 | A1* | 2/2017 | Clay | G06F 11/2007 |
| 2017/0118754 | A1* | 4/2017 | Kang | H04W 8/005 |
| 2017/0134145 | A1* | 5/2017 | Xin | H04L 1/0009 |
| 2017/0135120 | A1* | 5/2017 | Hiremath | H04W 72/12 |
| 2017/0142652 | A1* | 5/2017 | Liu | H04W 4/021 |
| 2017/0149671 | A1* | 5/2017 | Li | H04L 45/38 |
| 2017/0150419 | A1* | 5/2017 | Li | H04B 7/024 |
| 2017/0171819 | A1* | 6/2017 | Irony | H04W 52/0229 |
| 2017/0201940 | A1* | 7/2017 | Koratekere Honnappa | H04W 52/0206 |
| 2017/0214677 | A1* | 7/2017 | Cai | H04L 67/1097 |
| 2017/0238239 | A1* | 8/2017 | Ong | H04W 48/18 370/338 |
| 2017/0238250 | A1* | 8/2017 | Guo | H04W 52/0216 370/311 |
| 2017/0265130 | A1* | 9/2017 | Kakani | H04W 48/10 |
| 2017/0353925 | A1* | 12/2017 | Trainin | H04W 52/0216 |
| 2017/0359447 | A1* | 12/2017 | Chan | H04L 69/03 |
| 2018/0026802 | A1* | 1/2018 | Barrett | H04L 41/5019 370/259 |
| 2018/0145732 | A1* | 5/2018 | Shen | H04B 7/0617 |
| 2018/0191856 | A1* | 7/2018 | Chang | H04L 61/1511 |
| 2018/0199286 | A1* | 7/2018 | Ghosh | H04W 52/0216 |
| 2018/0227982 | A1* | 8/2018 | Singamsetty | H04W 84/18 |

OTHER PUBLICATIONS

F5 Networks, Inc., "Deploying the BIG-IP GTM for DNSSEC," https://www.f5.com/pdf/deployment-guides/gtm-dnssec-dg.pdf, Version 1.2, accessed Jan. 10, 2017, 16 pages.

(56) References Cited

OTHER PUBLICATIONS

Steve Friedl's Unixwiz.net Tech Tips, "An Illustrated Guide to the Kaminsky DNS Vulnerability," http://unixwiz.net/techtips/iguide-kaminsky-dns-vuln.html, 13 pages.
P. Mockapetris, "Domain Names—Concepts and Facilities," https://tools.ietf.org/html/rfc1034, Nov. 1987, 56 pages.
P. Mockapetris, "Domain Name—Implementation and specification," https://tools.ietf.org/html/rfc1035, Nov. 1987, 56 pages.
R. Arends et al., "DNS Security Introduction and Requirements," https://tools.ietf.org/html/rfc4033, Mar. 2005, 22 pages.
R. Arends et al., "Resource Records for the DNS Security Extensions," https://tools.ietf.org/html/rfc4034, Mar. 2005, 30 pages.
R. Arends et al., "Protocol Modifications for the DNS Security Extensions," https://tools.ietf.org/html/rfc4035, Mar. 2005, 54 pages.
JH Software, Simple DNS Plus "Check DNSSEC Signatures Tool," http://support.simpledns.com/kb/a173/check-dnssec-signatures-tool.aspx, Jul. 14, 2009, 4 pages.
Cisco, "Preparing for DNSSEC: Best Practices, Recommendations, and Tips for Successful Implementation," http://www.cisco.com/c/en/us/about/security-center/dnssec-best-practices.html accessed Jan. 10, 2017, 15 pages.
N. Brownlee, "DNS+DNSSEC: System Operation, Resource Records & Packet Formats," https://www.cs.auckland.ac.nz/courses/compsci742s2c/lectures/dns-4up.pdf, 2014, 7 pages.
W. Wijngaards, "Unbound Validating Caching Resolver," http://meetings.ripe.net/ripe-56/presentations/Wjngaards-Unbound_DNSSEC_Validating_Resolver.pdf, May 2008, 15 pages.
F5 Networks, Inc., "BIG-IP DNS: Load Balancing," https://support.f5.com/content/kb/en-us/products/big-ip-dns/manuals/product/bigip-dns-load-balancing-12-0-0/_jcr_content/pdfAttach/download/file.res/BIG-IP_DNS_Load_Balancing.pdf, Version 12.0, published Aug. 12, 2016, 40 pages.
F5 Networks, Inc., "BIG-IP DNS: Implementations," https://support.f5.com/content/kb/en-us/products/big-ip-dns/manuals/product/bigip-dns-implementations-12-0-0/_jcr_content/pdfAttach/download/file.res/BIG-IP_DNS_Implementations.pdf, Version 12.0, published Oct. 21, 2016, 120 pages.

\* cited by examiner

HASH BASED PER SUBSCRIBER DNS BASED TRAFFIC CLASSIFICATION

CROSS-REFERENCE TO RELATED APPLICATIONS

This application is a Utility Patent application based on a previously filed U.S. Provisional Patent Application Ser. No. 62/314,923 filed on Mar. 29, 2016, the benefit of the filing date of which is hereby claimed under 35 U.S.C. § 119(e) and which is further incorporated by reference in its entirety.

TECHNICAL FIELD

The present invention relates generally to network traffic management and, more particularly, but not exclusively to methods for improving the performance of network traffic management using name services.

BACKGROUND

Contemporary network traffic often employ various methods to secure the contents of the communication. In some situations, the methods used to secure the network traffic may impede traffic management systems. Accordingly, in some environments, for some types of network traffic there may be limited opportunity to rely on the payload contents of network traffic to determine how to apply network management policies. For example, in some cases, the payload of the network traffic may be encrypted such that it is difficult for a traffic management system to inspect the contents. In some network environments, one or more local and/or well-known DNS servers may be arranged to provide name services for one or more network domains. Also, in some circumstances a local/well-known DNS server may have to retrieve information from one or more remote/external DNS servers which information is in turn provided to clients of the local DNS server.

In some cases, clients may use name services to determine network addresses, among other things, for the resources and/or applications on the network. Traffic management systems may be arranged to monitor the name service communications of the clients even though they are unable to see the subsequently communicated contents of the application level communications. The information associated with the clients' name service communication may be useful for managing otherwise secure communication between a client and a server. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
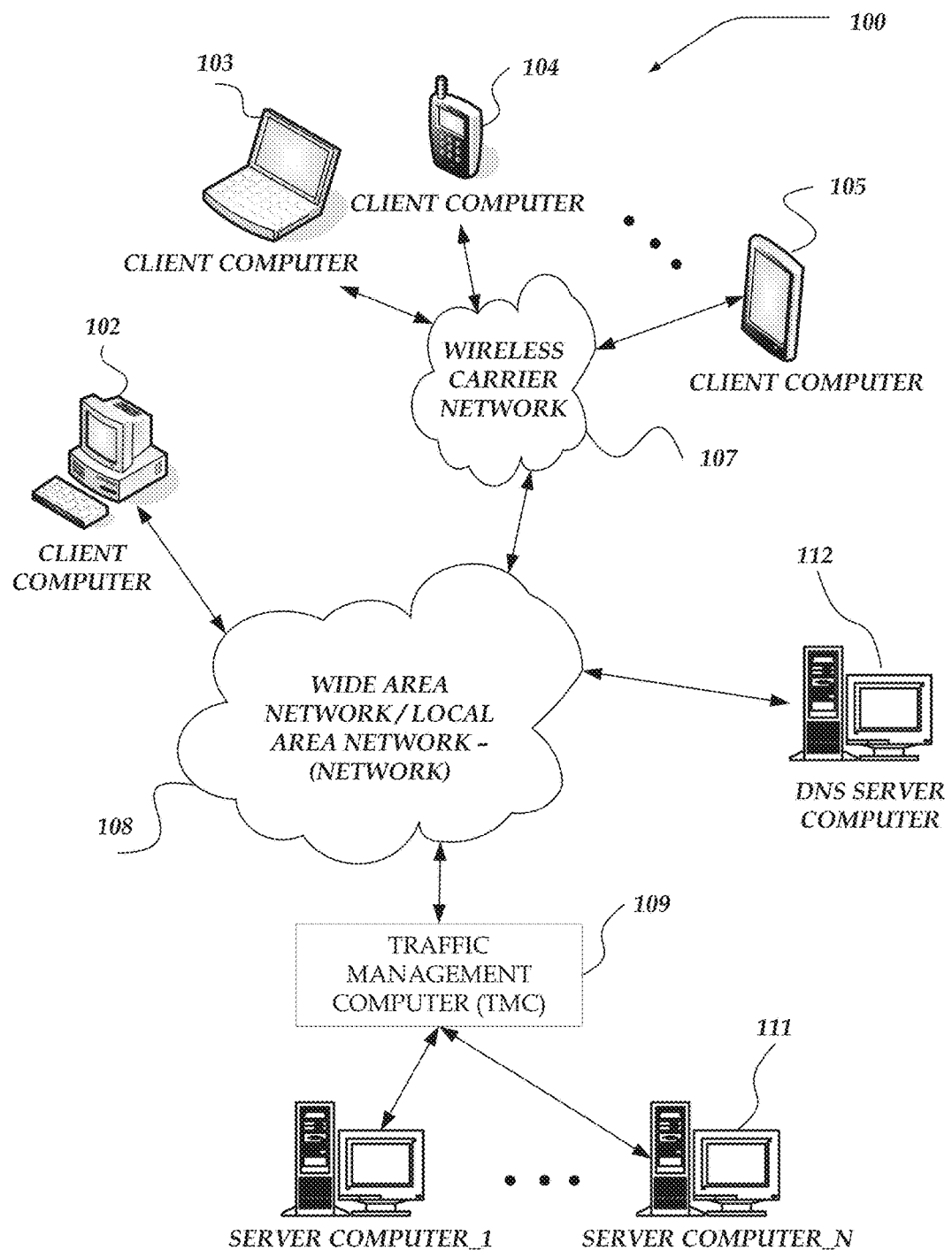
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a network packet, which may, under some circumstances, be a part of a network connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to a key that may be generated based on a tuple comprising some combination of fields specific to the embodiments need extracted from a network packet header, including those fields identified above.

As used herein, the terms "network flow," "connection flow,", or "flow" may refer to a network session established between two endpoints. In at least one of the various embodiments, a tuple may uniquely identify the flow. In at least one of the various embodiments, flow routing data associated with connection flows may be used to ensure that the network packets sent between the endpoints of a connection flow may be routed along the same path. In at least one of the various embodiments, the performance of connection oriented network protocols such as TCP/IP may be impaired if network packets may be routed using varying paths and/or directed to different endpoints. Further, one or more protocol options may be associated with a flow enabling the endpoints to employ one or more features of the protocol that may be otherwise optional.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

At used herein the term "subscriber" refers to a client device and/or client service that may be associated with a connection or connection attempt. Also, a subscriber may typically be associated with a user but the subscriber may refer to a service rather than a user.

As used herein the term "network traffic" refers to data and/or information communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the term "policy rule" refers to conditions and actions that may be paired together such that if a condition is met then the corresponding action may be executed. In at least one of the various embodiments, conditions may be compound conditions comprised of multiple conditions. In at least one of the various embodiments, actions may also be compound actions, or in other words, multiple actions may be associated with a condition and/or a policy rule. Policy rules may be arranged to perform various network traffic management actions on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management device or name service device.

As used herein the term "Domain Name System (DNS)" refers to one or more computers that are arranged to maintain a hierarchal index that maintains a mapping of network names to network resources. A typical example maintains a mapping of network names to network addresses and an additional "reverse" mapping of network addresses to network names. DNS servers may generate and communicate responses to requests that are sent from client computers, network computers, server computers, other DNS server computers, or the like. Commonly, a DNS query will include a name, such as a domain name, and/or hostname of a computer server. The DNS server will look up the name in its index and return the network address that is associated with the name provided by the request (if any). Also, DNS servers may be arranged to perform reverse lookups that return the hostname/domain name of computer from a valid network address. In some cases, when the information to answer a valid request is unavailable locally, a DNS server may be arranged to request the information from another DNS server. Further, DNS uses one or more well-known protocols for communicating over networks.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing communications using one or more traffic management computers (TMCs). In at least one of the various embodiments, one or more processors on the one or more TMCs may be arranged to extract tuple values from one or more fields in a name service reply received from one or more name service computers.

In at least one of the various embodiments, one or more processors on the one or more TMCs may be arranged to provide a name service key for each received name service reply based on the one or more tuple values extracted from each received name service reply, such that each name service key may be stored in a subscriber table managed by the one or more TMCs, such that the subscriber table associates each stored name service key with subscriber information.

Accordingly, if a new flow may be detected by the one or more processors on the one or more TMCs further actions may be performed, including: one or more processors on the one or more TMCs may be arranged to provide a flow key based on one or more tuple values extracted from a network packet included with the new flow, such that the flow key may be stored in a connection table managed by the one or more TMCs; in at least one of the various embodiments, one or more processors on the one or more TMCs may be arranged to compare the flow key to one or more name service keys that may be stored in a subscriber table managed by the one or more TMCs; and in at least one of the various embodiments, if the comparison provides affirmative results, one or more processors on the one or more TMCs may be arranged to provide subscriber information associated with the new flow, such that one or more traffic management policies that are associated with the subscriber information may be applied to the new flow. In at least one of the various embodiments, an affirmative comparison result may be provided if the new flow key matches a name service key that is stored in a subscriber table.

In at least one of the various embodiments, providing the name service key may further include: providing, a time bucket value based on a timestamp that may be associated with the name service reply; and ignoring the affirmative comparison if a timestamp of the network packet may be outside of the time bucket value.

In at least one of the various embodiments, providing the name service key may further include: extracting, a source address from the name service reply; extracting, a destination address from the name service reply; and providing a time bucket value from a time stamp that may be associated with the name service reply; and generating, a hash value that may be a function of the source address, the destination address, and/or the time bucket value.

In at least one of the various embodiments, one or more processors on the one or more TMCs may be arranged to receive a name service query from a computer. In at least one of the various embodiments, the one or more processors on the one or more TMCs may be arranged to extract values from one or more fields that may be in the name service query. In at least one of the various embodiments, the one or more processors on the one or more TMCs may be arranged to provide the name service key based on the values that may be extracted from the name service query. In at least one of the various embodiments, the one or more processors on the one or more TMCs may be arranged to store the name service key in a subscriber table managed by the one or more TMCs.

In at least one of the various embodiments, the one or more processors may be the same processor. And, in at least one of the various embodiments, the one or more processors may be on the same TMC.

Illustrated Operating Environment

FIG. 1 shows components of one embodiment of an environment in which the invention may be practiced. Not all of the components shown may be required to practice the invention, and variations in the arrangement and type of the components may be made without departing from the spirit or scope of the invention.

As shown, system 100 of FIG. 1 includes local area networks (LANs)/wide area networks (WANs)—network 108, wireless network 107, client computers 102-105, traffic management computer (TMC) 109, server computers 110-111, Domain name system server computer 112. Network 108 is in communication with and enables network traffic for communication between client computers 102-105, wireless network 107, TMC 109, and DNS server computer 112. Wireless carrier network 107 further enables communication with wireless devices, such as client computers 103-105. TMC 109 is in communication with network 108, server computers 110-111, and DNS server computer 112.

One embodiment of client computers 102-105 is described in more detail below in conjunction with FIG. 2. In one embodiment, at least some of client computers 102-105 may operate over a wired and/or a wireless network, such as networks 107 and/or 108. Generally, client computers 102-105 may include virtually any computer capable of communicating over a network to send and receive information, including instant messages, performing various online activities, or the like. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computer capable of connecting to another computer and receiving information, such as laptop computer 103, smart phone 104, tablet computer 105, or the like. However, portable computers are not so limited and may also include other portable computers, such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client computer may employ the browser application to perform various activities over a network (online). However, another application may also be used to perform various online activities.

Client computers 102-105 also may include at least one other client application that is configured to receive and/or send data to another computer. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, Mobile Identification Number (MIN), an electronic serial number (ESN), or other mobile computer identifier. The information may also indicate a content format that the mobile computer is enabled to employ. Such information may be provided in a network packet, or the like, sent between other client computers, TMC 109, server computers 110-111, DNS server computer 112, or other computers.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless carrier network 107 is configured to couple client computers 103-105 and its components with network 108. Wireless carrier network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN (WLAN) networks, cellular networks, and the like. In one embodiment, the system may include more than one wireless network.

Wireless carrier network 107 may further include an autonomous system of terminals, gateways, routers, and the like connected by wireless radio links, and the like. These connectors may be configured to move freely and randomly and organize themselves arbitrarily, such that the topology of wireless carrier network 107 may change rapidly.

Wireless carrier network 107 may further employ a plurality of access technologies including 2nd (2G), 3rd (3G), 4th (4G), $5^{th}$ (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless carrier network 107 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless carrier network 107 may include virtually any wireless communication mechanism by which information and/or network traffic may travel between client computers 103-105 and another computer, network, and the like.

Network 108 is configured to couple network computers with other computers, including, server computers 110-111, TMC 109, DNS server computer 112, client computer 102, and client computers 103-105 through wireless network 107. Network 108 is enabled to employ any form of computer readable media for communicating information in the form network traffic from one electronic device to another. Also, network 108 can include the Internet in addition to LANs, WANs, direct connections, such as through a universal serial bus (USB) port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Network traffic communicated over a network may include various signals associated with the low level operation of the network, routing, as well as higher level communication for applications. Furthermore, remote computers and other related electronic devices could be remotely connected to either LANs or WANs via a modem and temporary telephone link. In one embodiment, network 108 may be configured to transport information of an Internet Protocol (IP). In essence, network 108 includes any communication method by which information or network traffic may travel between computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of TMC 109 is described in more detail below in conjunction with FIG. 3. Briefly, however, TMC 109 may include virtually any network computer capable of managing network traffic between client computers 102-105 and server computers 110-111. In some embodiments, TMC 109 may be a multiprocessor system that includes one or more hardware processors. Such computers include, for example, routers, proxies, firewalls, load balancers, cache devices, devices that perform network address translation, or the like, or any combination thereof. TMC 109 may perform the operations of routing, translating, switching packets, network address translation, firewall services, network flow routing, or the like. In one embodiment, TMC 109 may inspect incoming network packets, and may perform an address translation, port translation, a packet sequence translation, and the like, and route the network packets based, at least in part, on the packet inspection. In some embodiments, TMC 109 may perform load balancing operations to determine a server computer to direct a request. Such load balancing operations may be based on network traffic, network topology, capacity of a server, content requested, or other traffic distribution mechanisms.

TMC 109 may be arranged to perform hardware-optimized operations that perform statistics gathering, per-subscriber policy enforcement, per-packet policy enforcement (e.g., packet address translations), high-speed flow caches, or the like, on managed connection flows between client computers, such as client computers 102-105, and server computers, such as server computers 110-111. In some embodiments, the one or more processors of TMC 109 may be arranged to perform one or more specific tasks for traffic management as described in detail below.

Server computers 110-111 may include virtually any network computer that may operate as a website server. However, server computers 110-111 are not limited to website servers, and may also operate as messaging server, a File Transfer Protocol (FTP) server, a database server, content server, email servers, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, virtual machines, and/or even within a cloud architecture. Thus, the invention is not to be construed as being limited to a single environment, and other configurations, and architectures are also envisaged. Likewise, TMC 109 may be comprised of a hypervisor and one or more virtual machines that may perform network management operations. In some embodiments, one or more operations may be performed by the same or different processor.

Illustrative Client Computer

Figure 2:
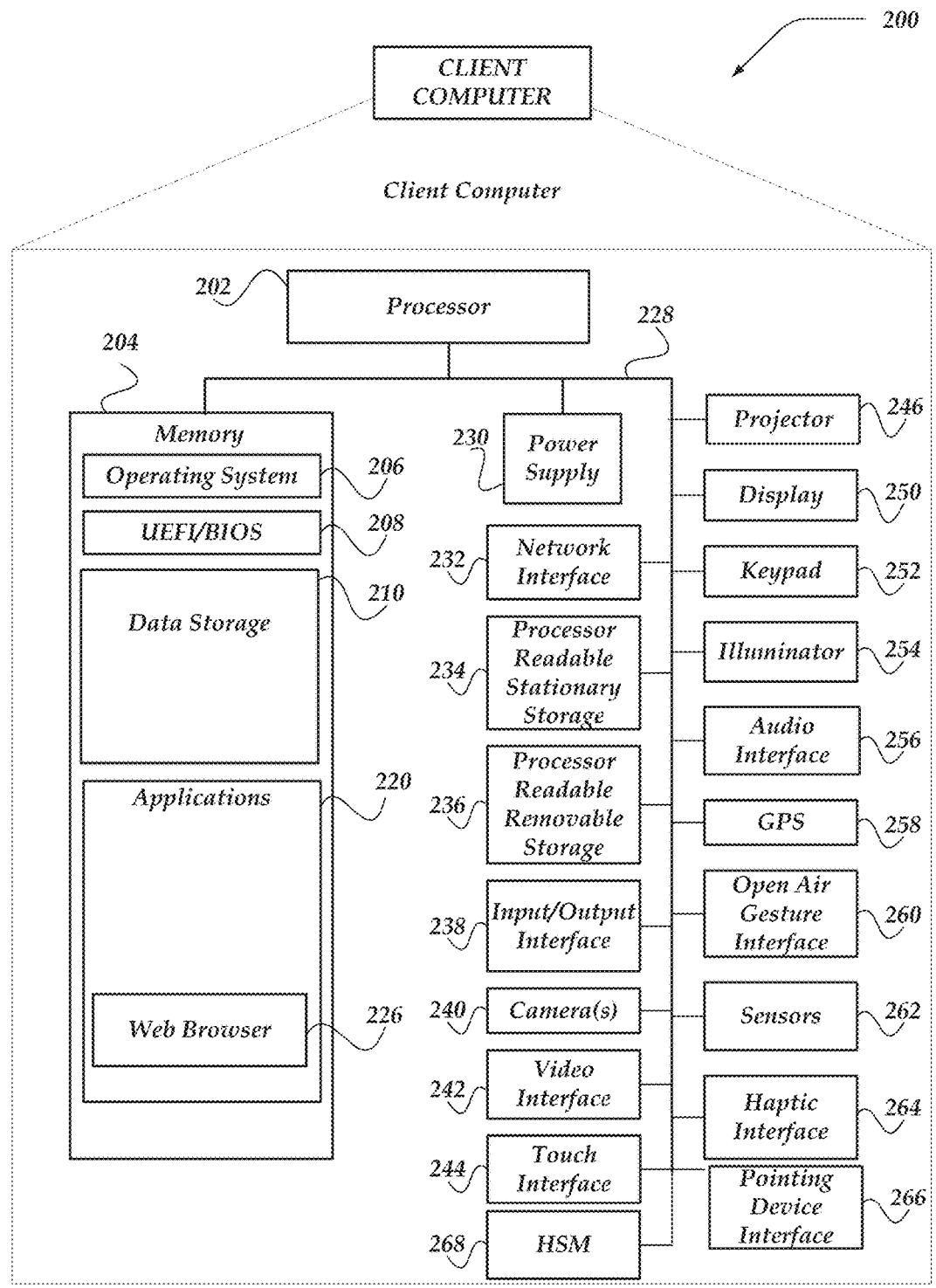
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store UEFI/BIOS 208 for controlling low-level operation of client computer 200. The memory may also store operating system 206 for controlling the operation of client computer 200. It will be appreciated that this component may include a general-purpose operating system such as a version of UNIX, or Linux, or a specialized client computer communication operating system such as Windows Phone, Android Operating System, or Apple's iOS operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. Applications 220 may include computer executable instructions which, when executed by client computer 200, transmit, receive, and/or otherwise process instructions and data, such as, communicating name service requests to TMC 109 and/or receiving name service responses from TMC 109.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In at least one of the various embodiments, applications, such as, web server 226, other applications, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 258. Also, in some embodiments, geolocation information may include information providing using one or more geo-location protocols over the networks, such as, wireless network 108 and/or network 111.

Additionally, in one or more embodiments (not shown in the figures), client computer 200 may include an embedded logic hardware device instead of a CPU or as an adjunct to a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
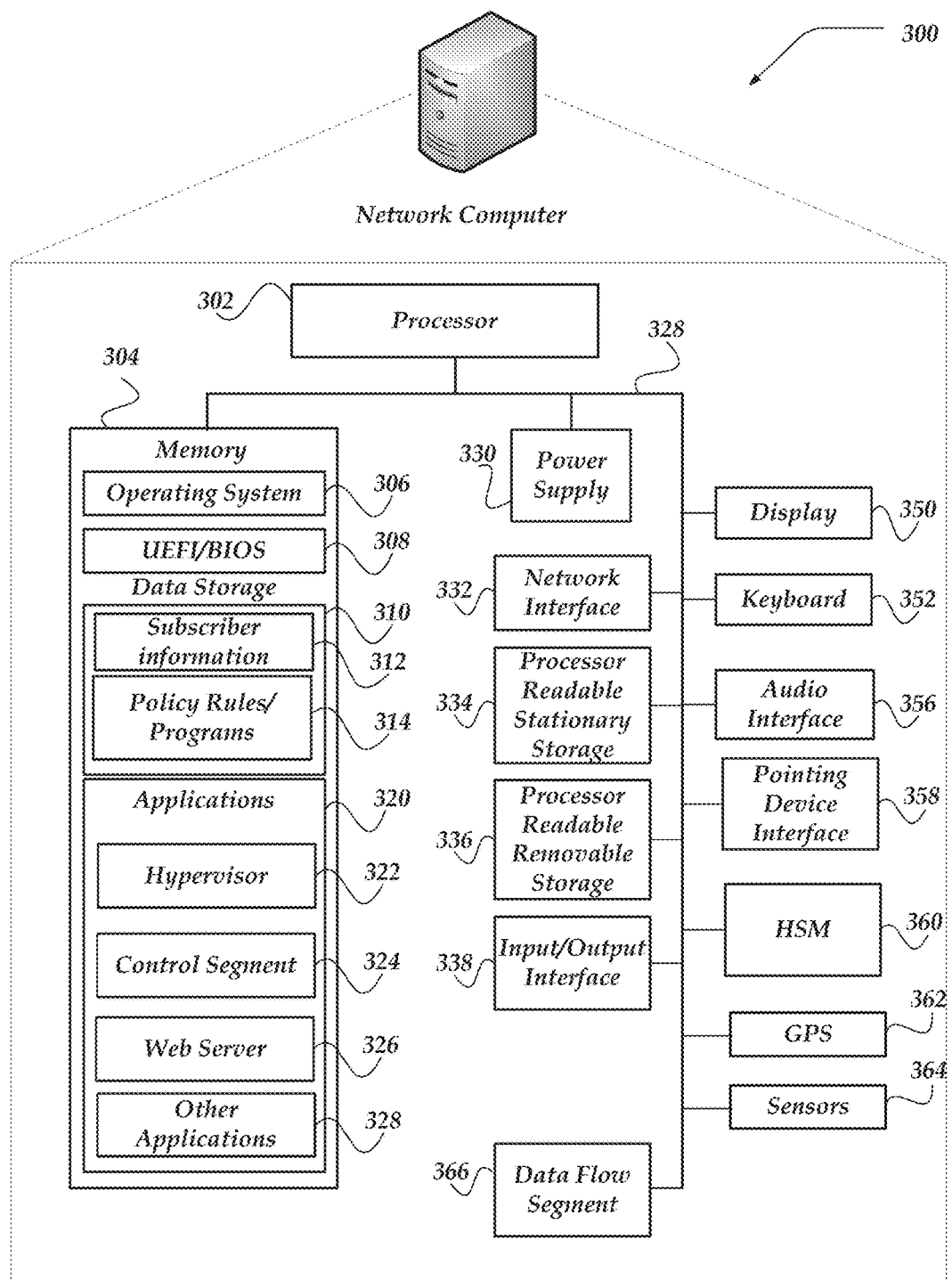
FIG. 3 shows an embodiment of a network computer that may be included in a system such as that shown in FIG. 1.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of traffic system management computer (TMC) 109 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

In at least one of the various embodiments, processor 302 may represent one or more separate processors (not shown). Likewise, in some embodiments, one or more of the processors comprising processor 302 may be arranged to include one or more processors (e.g., cores).

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under various and different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components may be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), non-transitory, and/or other types of memory. Memory 304 illustrates an example of computer-readable storage media (devices) for storage of information such as computer-readable instructions, data structures, program modules or other data. Memory 304 stores a unified extensible firmware interface and/or basic input/output system and/or (UEFI/BIOS) 308 for controlling low-level operations of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processors comprising processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, subscriber information 312, policy rules/programs 314, or the like.

Applications 320 may include computer executable instructions which, when executed by one or more processors of network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include hypervisor application 322, control segment 324, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, hypervisor 322, control segment 324, web server application 326, other applications 328, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocols over the networks, such as, wireless network 108 and/or network 111.

Furthermore, in at least one of the various embodiments, control segment 324 may be operative in a cloud-based computing environment. In at least one of the various embodiments, these applications, and others, that comprise a TMC may be executing within virtual machines and/or virtual servers that may be managed in a cloud-based based computing environment. Also, in at least one of the various embodiments, control segment 324, or the like, may located in virtual servers running in a cloud-based computing environment rather than being tied to one or more specific physical network computers.

Also, in at least one of the various embodiments, control segment 324 may be running in one or more virtual machines (VM's) executing on network computer 300. In at least one of the various embodiments, virtual machines running on network computer 300 may be managed and/or supervised by hypervisor 322. Likewise, in some embodiments, portions of control segment 324 may be running on one or more processors executing on network computer 300.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Network computer 300 may also include data flow segment (DFS) 366 for tracking connection flows between client computers, such as client computers 102-105 of FIG. 1, and server computers, such as server computers 110-111 of FIG. 1. In one embodiment, DFS 366 may include hardware-optimized for packet traffic management operations, such as repetitive operations associated with packet traffic management. For example, DFS 366 may perform statistics gathering, per-packet policy enforcement (e.g., packet address translations), per-subscriber policy enforcement, or the like, on connection flows maintained at DFS 366 in one or more connection flow tables. In some embodiments, DFS 366 may route, switch, forward, and/or otherwise direct packets based on policy rules for a particular connection flow signature (e.g., a 5 tuple of a received packet). Thus, DFS 366 may include capabilities and perform tasks such as that of a router, a switch, a routing switch, firewalls, network address translation, or the like. In at least one of the various embodiments, components of DFS 366 may comprise and/or work in combination to provide high-speed flow caches for optimizing packet traffic management. In at least one of the various embodiments, DFS 366 may be arranged to include high-speed cache memory for mapping DNS hash keys/identifiers to connection information, including a subscriber table that include a name service key and various subscriber information Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
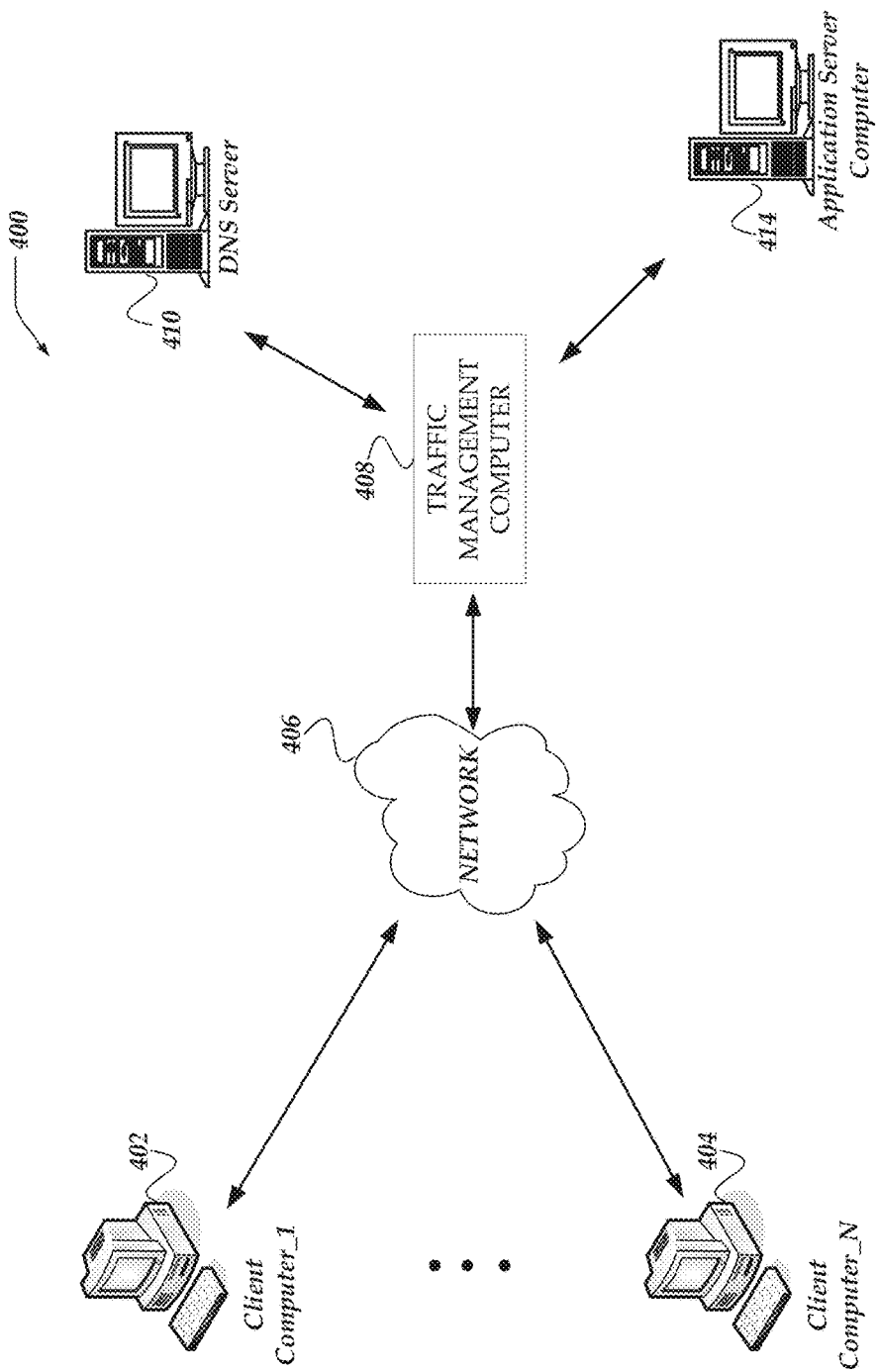
FIG. 4 illustrates a portion of a system for hash based per subscriber DNS based traffic classification in accordance with at least one of the embodiments.

FIG. 4 illustrates a portion of system 400 for hash based per subscriber DNS based traffic classification in accordance with at least one of the various embodiments. In at least one of the various embodiments, one or more client computers, such as, client computer 402, client computer 404, or the like, may be performing communication over a network through network 406. In at least one of the various embodiments, Network 406 may be a network, such as, wireless network 107, network 108, or the like, or combination thereof. Network 406 may be in communication with TMC 408. In at least one of the various embodiments, TMC 408 may be in communication with one or more server computers, such as, DNS server computer 410, and application server computer 414.

In at least one of the various embodiments, client computers 402-404 may be arranged to communicate name service requests over network 406 to TMC 408. Accordingly, in at least one of the various embodiments, TMC 408 may be arranged to monitor these requests. In some cases, TMC 408 may communicate the requests to a name service, such as, DNS server computer 410. Such communication may include requests for name service information that may be used to answer a name service query from a client computer and/or subscriber.

Note, client computers may include any type of computer or subscriber that needs name service information, such as, client computers, network computers, mobile computers, virtual machines (including cloud-based computers), or the like. Likewise, in production environments, one of ordinary skill in the art will appreciate there may be more or fewer DNS server computers, application server computers, TMCs, and/or client computers than depicted in FIG. 4.

In at least one of the various embodiments, TMC 408 may be arranged to correlate the communications with a DNS server to an individual subscriber's communications (e.g., subscriber network flows). In some the embodiments, information provided in the subscriber's DNS query and/its corresponding reply may be employed to provide correlation information that may be used for policy enforcement. In at least one of the various embodiments, the correlation information provided from the DNS communications may be combined with other correlation information, metrics, conditions, or the like, for applying rule-based policies to the network traffic that may be associated with individual subscribers.

In one or more of the various embodiments, a name service key may be generated using information included in the name service. For example, tuple information included in name service traffic (e.g., queries or replies) may be used to generate a name service key using one or more hash functions. The name service key may be used an index or key into a subscriber table.

Accordingly, in one or more of the various embodiments, subsequent network flows may be correlated with records in the subscriber table based on computing a flow key from the same information (and hash function) used to generate the name service key. Thus, in some embodiments, if the flow key matches a name service key in the subscriber table, subscriber information that is associated with the matched name service key may be correlated with the subsequent network flow.

Figure 5:
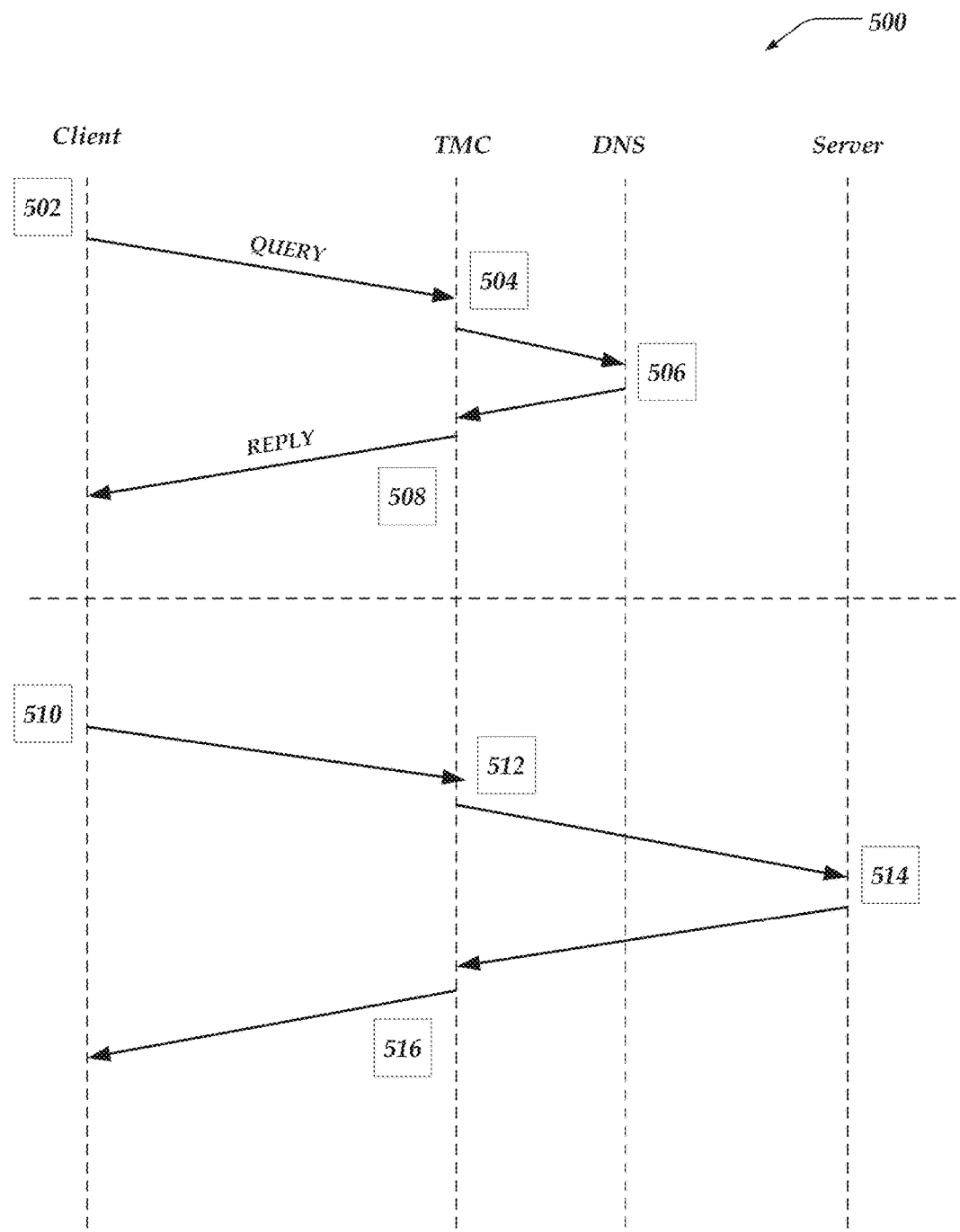
FIG. 5 illustrates a sequence diagram showing a sequence that includes sequences for processing name service requests in accordance with at least one of the various embodiments.

FIG. 5 illustrates a sequence diagram showing sequence 500 that includes sequences for processing name service requests in accordance with at least one of the various embodiments. As described above, a TMC may be arranged to monitor traffic between clients and servers. In some embodiments, the network for accessing the servers may be arranged so one or more TMCs may monitor the network traffic associated with communications to and from the servers and/or applications that may be running on the servers. Sequence 500 shows a sequence of communication transactions that may be monitored by a TMC.

At step 502, in at least one of the various embodiments, a client (e.g., a client computer) may be interested in communicating with a particular server, service, application, or the like. In some cases, the client may have a common name that is associated with the services they are interested in but not a network address to the service. Or, the client may have some information for referencing the service (e.g., hostname) but it still requires a name service to confirm the information or provide additional information that may be necessary for communicating with the service and/or servers.

Accordingly, in some embodiments, a client may send a query to a name service (e.g., DNS query) to try to obtain the desired information.

At step 504, in at least one of the various embodiments, since the TMC is arranged to monitor the communications between the clients and the name service, the TMC may obtain access to the name service query. In at least one of the various embodiments, the TMC may be arranged to record the some or all of the connection information (e.g., tuple information) and associate it with a DNS query using a data structure, such as, a subscriber table. If the query information is stored, the query may be forwarded to the appropriate DNS (name service). In some embodiments, the TMC may be arranged to passively monitor the communication from the clients and record the name service information without interrupting the communication to the DNS.

In at least one of the various embodiments, the TMC may be arranged to proxy the communication from the clients to the DNS by acting as a network endpoint. In such embodiments, the TMC may be a terminating endpoint for the clients and create its own connections to the DNS that may be employed to the forward the communication from the clients.

At step 506, in at least one of the various embodiments, the TMC may provide the query to a DNS. The particular DNS may depend on the network configuration of the clients, the TMC, the network, or the like, or combination thereof. The DNS may provide the information and package it into a reply to the client's query. The particular format of the reply and its contents may vary depending on the particular query and/or the name service protocol that is being used. In most cases, the format of the reply will conform to a well-known name service protocol, such as, DNS, LDAP, Active Directory, or the like. In some cases, a custom protocol may be used, in these cases, the TMC may be provided configuration information that corresponds to the custom protocol.

In some cases, the name service may query other name service servers to obtain and/or confirm the information used to form the reply. The configuration of the name service as well as the contents of the query may determine if other name service servers may be involved in providing the reply.

In at least one of the various embodiments, the client may include hostname information in the query. In such cases, the client may be expecting at least one or more network addresses that are associated with the hostname information that included in the query.

In at least one of the various embodiments, if the reply is ready, the DNS may communicate the reply back to the TMC. In some embodiments, the DNS may communicate the reply directly to the client. In those cases, the TMC may be arranged to passively monitor the communication from the DNS to the client.

At step 508, in at least one of the various embodiments, the TMC may obtain the reply message. The reply message may be correlated with the query of step 504 based on a comparison of the query information stored by the TMC at step 504 and the information included in the reply. In some embodiments, the tuple information included in the name service reply may be compared to the tuple information of the name service queries to determine which query the reply is associated with. In other embodiments, additional information such as sequence numbers, identifiers, cookies, or the like, or combination thereof may be used along with the tuple information to correlate the replies and queries.

In at least one of the various embodiments, the TMC may be arranged to store information included in the reply and/or the query and associate it with the client that made the request. The information from the reply that is stored may depend on how the TMC may be configured. In some cases, such information may include the hostname of the service (included in the query), the network address in the included in the reply, type of hostname (e.g., DNS type of record), resource record information, or the like. In one or more of the various embodiments, this information may be stored in a subscriber table.

In at least one of the various embodiments, if the name service transaction is unencrypted, the TMC may capture information from the query and reply that may be useful for applying one or more traffic management policies to subsequent communications to and from the client.

At step 508, in at least one of the various embodiments, the TMC may provide the name service reply to the client. In at least one of the various embodiments, the client may receive the reply and respond as it normally would. The monitoring performed by the TMC may be transparent such that the client may be unaware that the TMC is monitoring its communication with the DNS.

At step 510, in at least one of the various embodiments, the client may use the name service information to communicate with the servers/services it was interested in. For example, the reply may include a particular network address of a service that the client may employ to communicate with the service.

At step 512, in at least one of the various embodiments, the TMC may monitor the communication from the client and apply one or more traffic management policies to the network traffic. In some cases, the communication payload from the client may be encrypted or otherwise opaque to the TMC. However, the TMC may be arranged to apply policies based the correlation of the client communication to the information gathered from the name service transaction (e.g., information obtained during steps 502-508).

At step 514, in at least one of the various embodiments, a server hosting the application/service accessed by the client may prepare a response for the client and send it to the client.

At step 516, in at least one of the various embodiments, the TMC may intercept the communication from the server and apply various traffic management policies. In some embodiments, the communication from the server may be encrypted or otherwise opaque to the TMC. Accordingly, in at least one of the various embodiments, the TMC may be arranged to provide correlation information based on correlations between the information gathered from the name service transaction (e.g., information obtained during steps 502-508) and the communication provided by the server. The correlation information may be employed if determining which traffic management policies to apply to the communication from the server. Next, the communication may be provided to the client.

In at least one of the various embodiments, as described above, if a client makes a name service request in advance to access a server or service, the TMC may observe the name service traffic and extract information that may be useful for classifying the subsequent communications from the client.

In some embodiments, the information extracted from the name service network traffic may be stored in a subscriber table. Thus, in cases where the payload/contents of the communication between the client and the service may be opaque to the TMC, the name service information stored in the subscriber table may be useful for determining how to manage the traffic. Likewise, the name service information may also be useful for determining the traffic management policies to apply to non-opaque traffic.

For example, the name service information may enable the TMC to apply one or more policies without having to perform deep packet inspection. If the name service information included in the subscriber table indicates that the service the client is accessing is a mail service, the TMC may be arranged to apply mail service policies based on the correlation of the name service information to the communications rather than having to use deep packet inspection to determine if the communication is related to email. In this example, the client may have sent a DNS query that included a hostname such as mail.foo.bar. And, the DNS may have sent a reply that includes a network address of a mail server and a confirmation that the network address corresponds to an email mail service/server. In this example, the TMC may reasonably conclude that the traffic sent between the client and the provided network address is related to email based on the correlation between the name service information.

Figure 6:
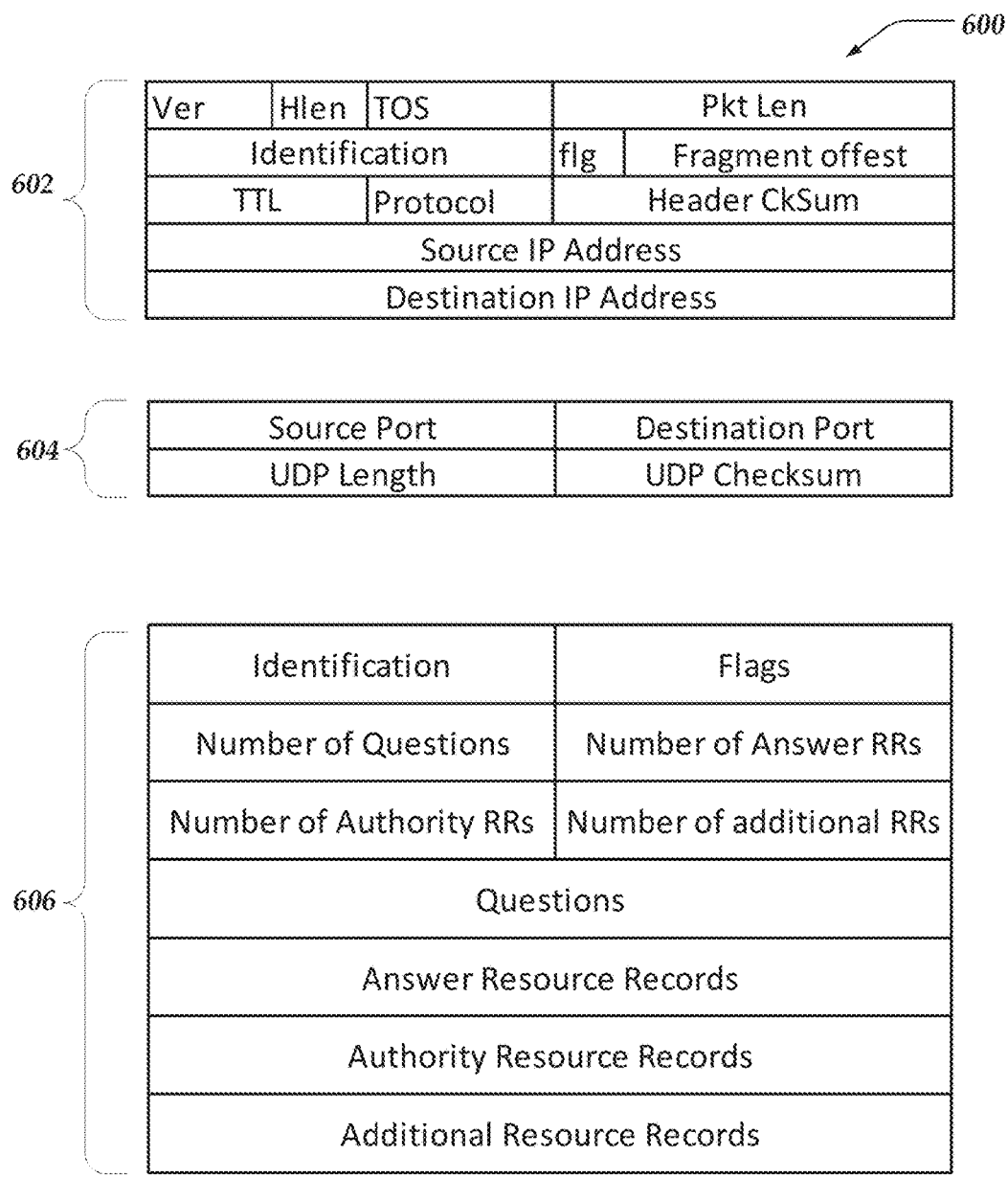
FIG. 6 illustrates components of a DNS communication network packet that is in accordance with at least one of the various embodiments.

FIG. 6 illustrates components of a DNS communication using packet 600 that is in accordance with at least one of the various embodiments. In at least one of the various embodiments, a name service system may be arranged to use one or more well-known protocols. Knowledge of the protocol format may be leveraged to identify information in the name service communications that may be correlated with subsequent client communications.

In at least one of the various embodiments, packet 600 is an example of a DNS packet format that may be used for name service queries and replies. In some embodiments, name service communication may be conducted using IP and UDP. Accordingly, packet 600 may include IP header 602, UDP header 604, and DNS message 606.

In this example, a tuple information included in IP header 602 or UDP header 604 may be used to generate a name service key. The name service key may be used to index subscriber information, such as, questions, answers, or the like, in a subscriber table.

Figure 7:
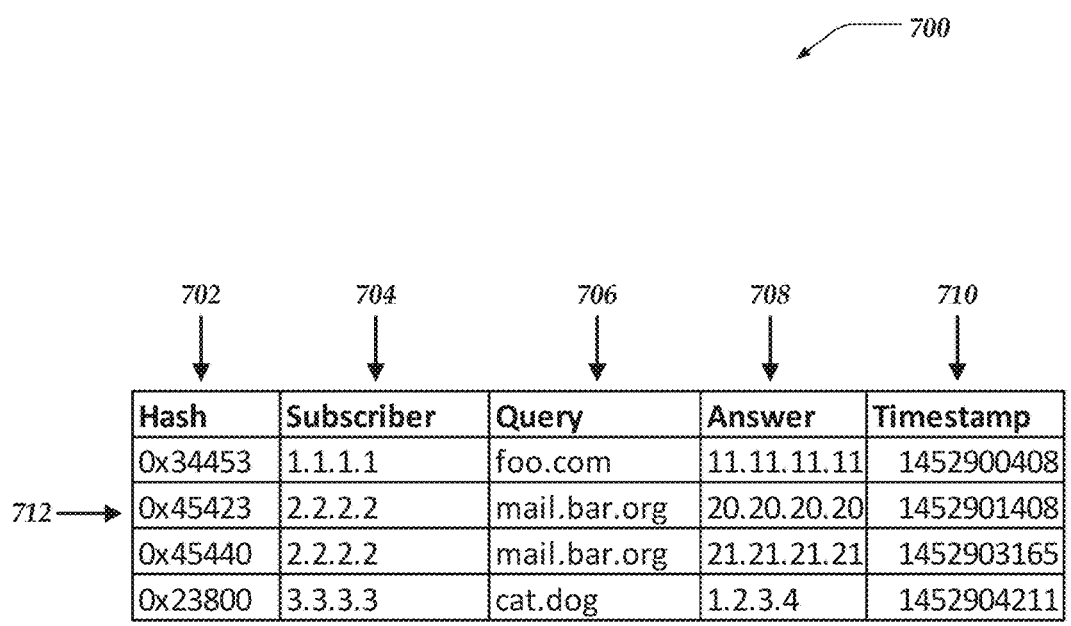
FIG. 7 illustrates a logical representation of a table for storing subscriber and DNS information in accordance with at least one the various embodiments.

FIG. 7 illustrates a logical representation of subscriber table 700 for storing subscriber and DNS information in accordance with at least one the various embodiments. In some embodiments, subscriber table 700 may include various columns for associating subscriber information and DNS query/reply information. In this example, column 702 may store a hash key value or index value as a name service key for quickly associating a row in subscriber table 700 with a network packet; column 704, may hold a network address of a subscriber; column 706 may hold some or all of the query information extracted from a name service query; column 708 may hold some or all of the reply information extracted from a name service reply; and column 710 may hold a timestamp value that may be associated with a name service transaction. As described in FIG. 5 and in further detail below, the information included in table 700 may be information that is extracted by a TMC that may be monitoring network communication between a name service and a client of the name service.

Row 712 shows an example record that is in accordance with at least one the various embodiments, the record represents a monitored name service transaction stored by a TMC. Row 712 is based on a subscriber with a network address of 2.2.2.2 that made a name service query (e.g., DNS query) to lookup that network address that is associated with the hostname mail.bar.org. Row 712 indicates that the name service reply included one or more network addresses that may be associated with the hostname mail.bar.org.

In some embodiments, a name service key may be a hash value, such as the hash values in subscriber table 700 may be generated from one or more fields of information that may be extracted from the network traffic. In this example, for row 712, a hash function may be used to generate hash value 0x45423 from the subscriber network address, the answer network address, and the timestamp. Accordingly, in some embodiments, subsequent network traffic may be associated with one or more records in subscriber table 700 by computing a hash value using the same process that was used to generate the hash values in the subscriber table. In some embodiments, timestamps may be truncated to create time buckets. For example, if a system generates a timestamp that is accurate to one second, a time range bucket having a range (duration) of one minute may be computed by disregarding the seconds portion of the timestamp value. Thus, in some embodiments, the time bucket value may be used in the hash function rather than the actual timestamp value.

In some embodiments, using a time bucket value enables the hashing function to be used for correlating network packets. Network packets that have the same source address and destination address that are observed within the duration of the time bucket may have the same hash key value. Likewise, network packets having the same source address and destination address that are observed outside the duration of the same time bucket will have different hash key value—even though their source addresses and destinations addresses may be the same.

Thus, in some embodiments, fast indexing associated with hash key or hash tables may be used to determine if incoming network packets may be associated with the name service information stored by the TMC. In some embodiments, a high speed hardware memory cache comprising DFS 366 may be arranged to store such name service transaction information in a subscriber table and/or to perform the hashing functions. Accordingly, in one or more of the various embodiments, flow correlation performance of the TMC may be improved by using a data structure such as the subscriber table. For example, incoming network flows may easily correlated with their associated subscriber information by hashing select tuple information included in network packets of the network flow to produce a flow key that may be used to lookup the subscriber information without require encrypted flow payloads to be decrypted.

In at least one of the various embodiments, there may be more than one name service answer for a given query/question. In these situations, in some embodiments, multiple records may be stored as shown in table 700. For example, table 700 shows that mail.bar.org may be associated with two network addresses.

Generalized Operations

FIGS. 8-12 represent the generalized operations for systems and methods for hash based per subscriber DNS based traffic classification in accordance with at least one of the various embodiments. In at least one of the various embodiments, processes 800, 900, 1000, 1100, and 1200 as described in FIGS. 8-12 may be implemented by and/or executed on a single traffic management computer (TMC) and/or network computer, such as network computer 300 of FIG. 3. In other embodiments, these processes or portions thereof may be implemented by and/or executed on a plurality of network computers, such as network computer 300 of FIG. 3, client computer 200 of FIG. 2, or the like. Also, in some embodiments, these processes or portions thereof may be implemented by and/or executed on one or more processors of a TMC, name service device, or network computer. However, embodiments are not so limited, and various combinations of network computers, client computers, processors, virtual machines, TMCs, name service computers, name service devices, or the like may be utilized. Further, in at least one of the various embodiments, the processes described in conjunction with FIGS. 8-12 may be operative in traffic management computers, systems, and/or architectures, such as, those described in conjunction with FIGS. 1-7.

Figure 8:
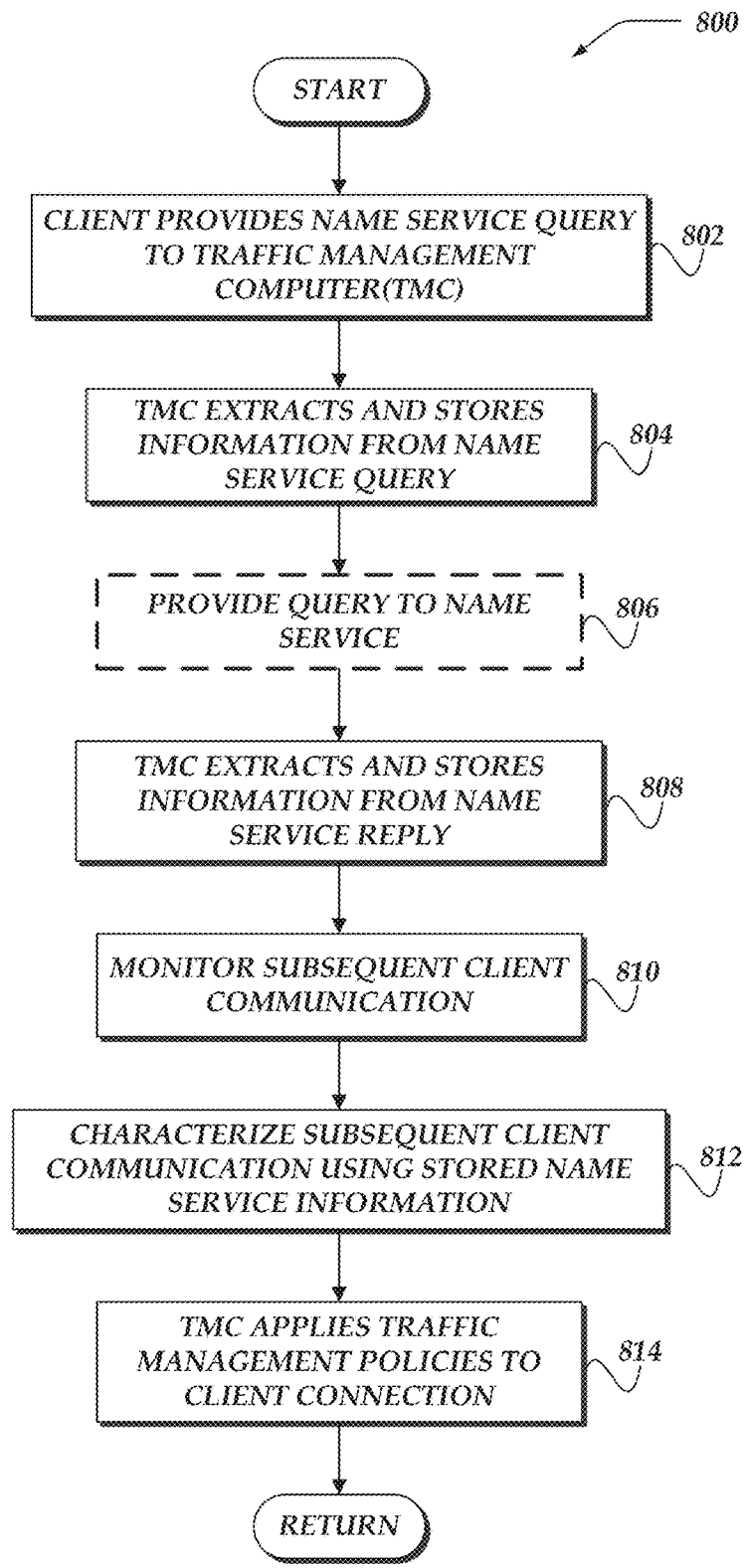
FIG. 8 illustrates an overview flowchart of a process for hash based per subscriber DNS based traffic classification, in accordance with at least one of the various embodiments.

FIG. 8 illustrates an overview flowchart of process 800 for hash based per subscriber DNS based traffic classification, in accordance with at least one of the various embodiments. After a start block, at block 802, a client may provide a name service query to a traffic management computer (TMC). As described above, the TMC may be arranged to intercept a client's communication to a name service and act as a connection endpoint. In other embodiments, the TMC may be arranged to passively monitor the client's communication with a name service.

At block 804, in at least one of the various embodiments, the TMC may extract and store information included in the name service query. In at least one of the various embodiments, the name service query may include information that may be used to characterize subsequent client communications. For example, the query may include a source IP address and one or more hostnames/domain names. In some cases, the TMC may be arranged to extract and store one or more fields from the communication that may be used for correlating subsequent network traffic with the name service query. See, FIG. 7.

At block 806, in at least one of the various embodiments, optionally, the TMC may communicate the name service query to the name service. For example, the TMC may intercept the query from the client and forward the query to the name service (e.g., DNS server) that may be responsible for answering the query. In such cases, the TMC may proxy the communication between the client computers and the DNS servers. However, in some embodiments, the TMC may be arranged to passively monitor the network traffic. Thus, in these embodiments, the communication may continue directly over the network to the name service computers rather than being sent by the TMC over another network connection.

At block 808, in at least one of the various embodiments, the TMC may extract and store information from the name service reply. In at least one of the various embodiments, in response to the query, the name service may provide a reply. The particular contents of the reply may vary depending on the query and/or the name service protocol. In some embodiments, the reply may include one or more network addresses that are associated with a hostname/domain name included in the query. The format and contents of the reply may depend on the name service protocol that is being used as well as the underlying networking protocols. For example, a DNS reply may comprise one or more network packets, such as, packet 600 shown in FIG. 6.

In one or more of the various embodiments, subscriber information may be stored in a subscriber table that may be used to correlate subsequent network traffic with subscriber information.

At block 810, in at least one of the various embodiments, the TMC may be arranged to monitor subsequent network communication with the client computer. In at least one of the various embodiments, the TMC may be arranged to monitor other network traffic besides just the name service communications. For example, a client computer may be accessing services hosted on server computers that are 'behind' the TMC. In such cases, the TMC may be configured to monitor some or all of the network traffic directed to the managed services and the network traffic provided from the managed services computers.

At block 812, in at least one of the various embodiments, the TMC may employ the information extracted and stored from the prior name service communications to characterize subsequent network communication. For example, in cases where the communication between client computers and servers managed by the TMC may be encrypted or otherwise obscured, the name service information may be used in part to determine the traffic management policies that may be applied to the network traffic.

At block 814, in at least one of the various embodiments, the TMC may apply one or more traffic management policies to the monitored network communications. In some cases, policies applied to the network traffic may be based on the name service information that may be determined to be associated with the network traffic. Next, control may be returned to a calling process.

Figure 9:
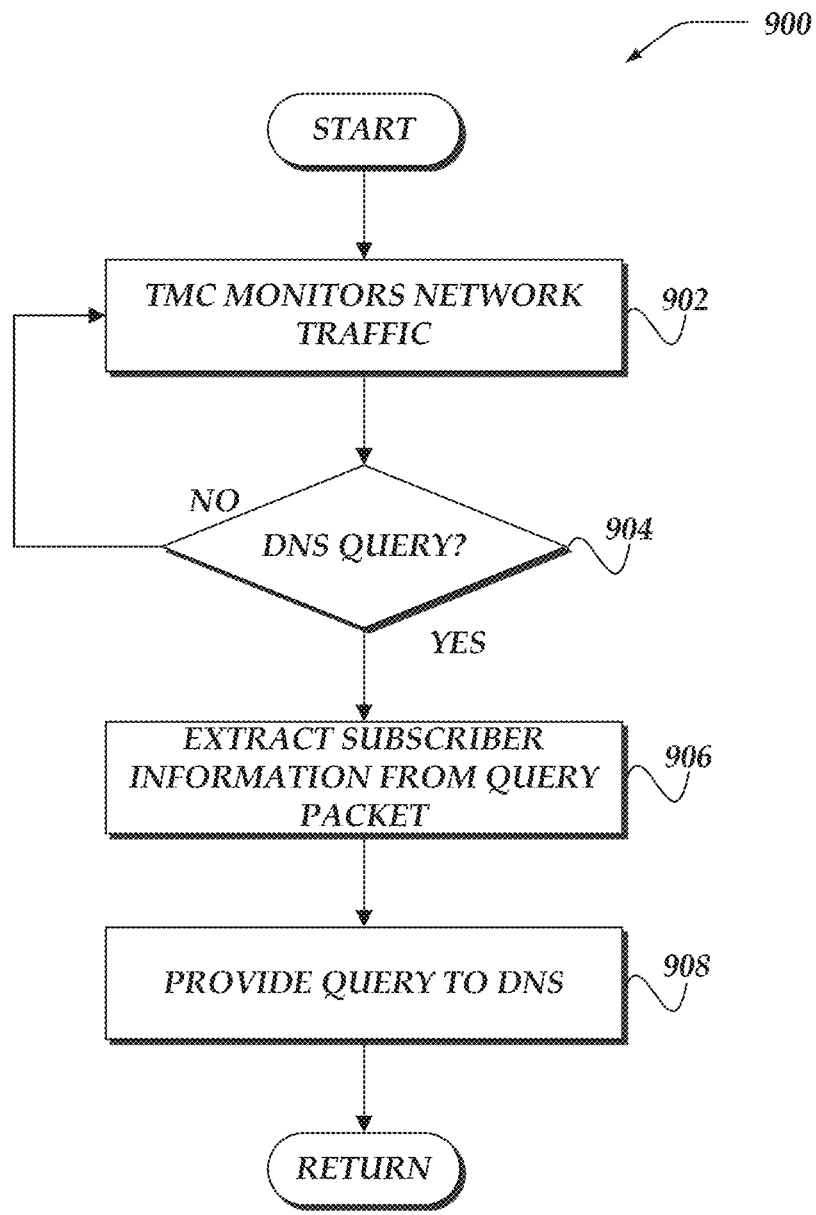
FIG. 9 illustrates a flowchart of a process for hash based per subscriber DNS based traffic classification, in accordance with at least one of the various embodiments.

FIG. 9 illustrates an overview flowchart of process 900 for hash based per subscriber DNS based traffic classification, in accordance with at least one of the various embodiments. After a start block, at block 902, in at least one of the various embodiments, the traffic management computer (TMC) may be arranged to monitor network traffic on one or more networks. In one or more of the various embodiments, the TMC may be arranged to extract information from the monitored network traffic for storage in connection table. In some embodiments, connection tables may be used by associated various connections or network flows with traffic management policies. For example, if a persistent load balance policy is being enforced, a connection table may be used for store information for persistently associating a backend server with a client connection.

Also, in one or more of the various embodiments, connection tables may be employed for determining if monitored network traffic is associated with a previously seen network flow. For example, tuple information from monitored network traffic may be used to generate flow key that may be used to index the flow information in the connection table. Thus, subsequent network traffic that provides a previously seen flow key is likely to be a known flow rather than a new flow.

At decision block 904, in at least one of the various embodiments, if the network traffic includes a DNS query (e.g., or other name service query), control may flow block 906; otherwise, control may loop back to block 902 for continued traffic monitoring.

At block 906, in at least one of the various embodiments, subscriber information may be extracted from the network traffic that may be associated with or included in the DNS query.

At block 908, in at least one of the various embodiments, the DNS query may be provided to the DNS. Next, control may be returned to a calling process.

Note, in some embodiments, TMCs may be arranged to monitor various types of network traffic. In at least one of the various embodiments, a TMC is not necessarily limited to monitoring name service communications. Accordingly, other, processes and/or processors of the TMC may be arranged to perform additional monitoring and/or traffic management processes.

Figure 10:
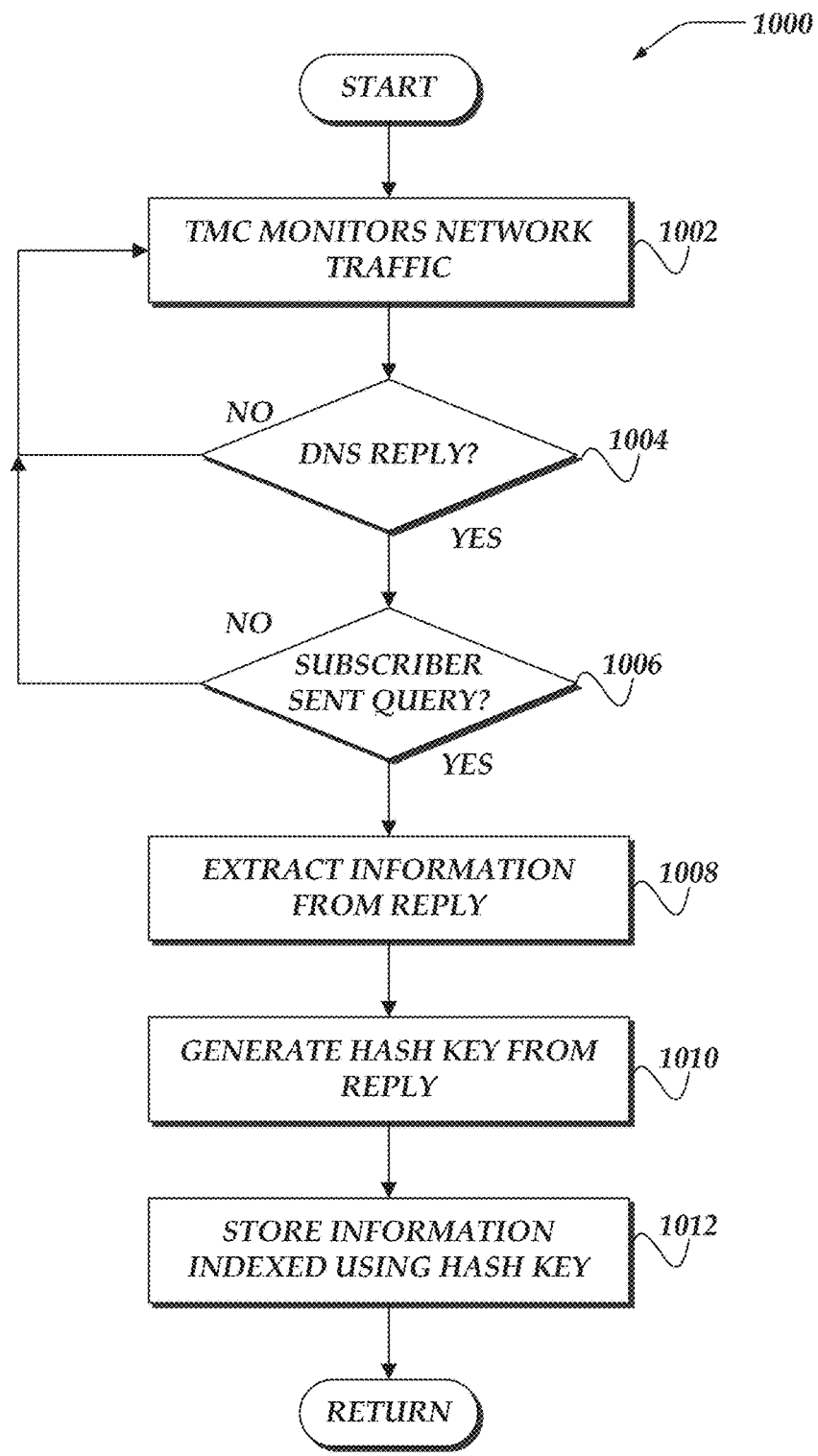
FIG. 10 illustrates a flowchart of a process for hash based per subscriber DNS based traffic classification, in accordance with at least one of the various embodiments.

FIG. 10 illustrates an overview flowchart of process 1000 for hash based per subscriber DNS based traffic classification, in accordance with at least one of the various embodiments. After a start block, at block 1002, a TMC may be monitoring network traffic as described above.

At decision block 1004, in at least one of the various embodiments, if the network traffic includes a DNS reply, control may flow to decision block 1006; otherwise, control may loop back to block 1002.

At decision block 1006, in at least one of the various embodiments, if a subscriber sent the query, control may flow to block 1008; otherwise, control may loop back to block 1002.

In at least one of the various embodiments, if the DNS reply is associated with a subscriber, the reply may be associated with a query sent by the same subscriber. In some cases, the reply may be associated with clients that are not being monitored or are otherwise of no concern to the TMC. In such cases, the query may be ignored, or otherwise processed as normal network traffic.

In at least one of the various embodiments, a TMC may be arranged to determine if a query is associated with a subscriber based on one or more portions of the network communication corresponding to the query and/or configuration information. For example, a TMC may be configured to consider all clients that have a defined range of network addresses as subscribers. In other examples, a TMC may be arranged to assume that any client that submit queries are subscribers.

At block 1008, in at least one of the various embodiments, the TMC may be arranged to extract information from the reply. In some embodiments, the reply may be one or more network packets arranged similar to packet 600. Accordingly, one or more fields, such as, answers, may be extracted from the network traffic. In some embodiments, the particular fields may be determined based on configuration information that conforms to the name service protocols that are being used.

At block 1010, in at least one of the various embodiments, a name service key may be generated from information included in the reply. In at least one of the various embodiments, one or more hash key functions may be employed to generate the hash key value from information include in the reply. In some embodiments, the hash key values may be computed by one or more special purpose processors, such as, DFS 366, or the like.

At block 1012, in one or more of the various embodiments, subscriber information provided by or associated with the reply may be stored as one or more records in a subscriber table such as table 700 in FIG. 7. In some embodiments, high-speed cache memory may be used to store the subscriber tables used for storing the name service information. Accordingly, in some embodiments, the subscriber tables may be located in a DFS, such as DFS 366. Next, control may be returned to a calling process.

Figure 11:
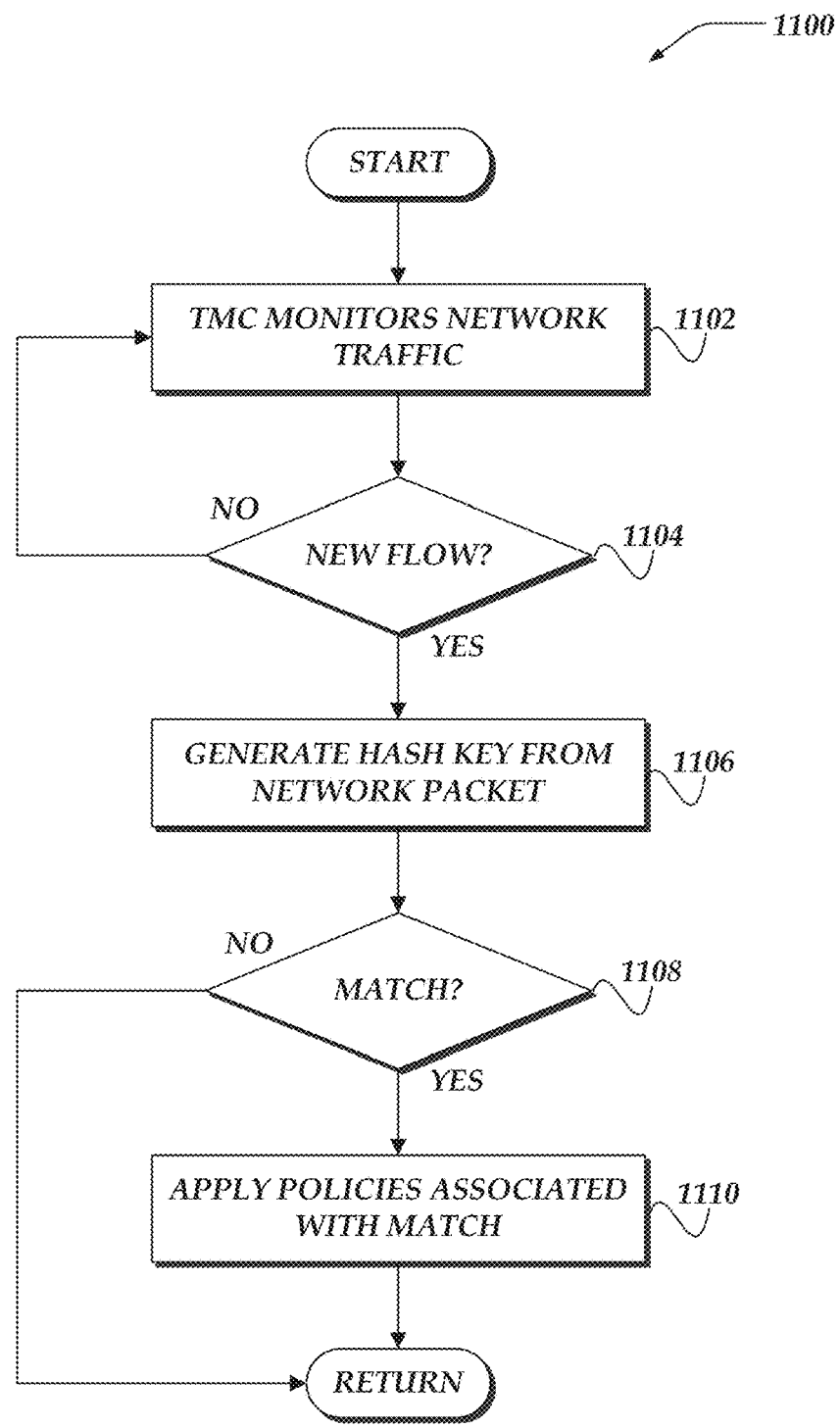
FIG. 11 illustrates a flowchart of a process for hash based per subscriber DNS based traffic classification, in accordance with at least one of the various embodiments.

FIG. 11 illustrates an overview flowchart of process 1100 for hash based per subscriber DNS based traffic classification, in accordance with at least one of the various embodiments. After a start block, at block 1102, in at least one of the various embodiments, the TMC may be arranged to monitor network traffic as described above.

At decision block 1104, in at least one of the various embodiments, if the network traffic is associated with new connection flow, control may flow to block 1106; otherwise, control may loop back to block 1102. One of ordinary skill in the art will appreciate the TMC may include one or more facilities for distinguishing new connections from current connections. In some embodiments, a table of active connections associated with known flows may be kept in a connection table stored in a high-speed memory cache. In at least one of the various embodiments, connections may be identified by one or more features/characteristics of the network traffic associated with their flow, such as, tuple information, timestamps, sequence numbers, cookies, or the like, or combination thereof. Thus, in at least one of the various embodiments, the TMC may be arranged to identify new connections or new flows by comparing one or more characteristics of their network traffic with the one or more characteristics of previously seen connections.

At block 1106, in at least one of the various embodiments, a hash key for using as a flow key may be generated. As described below in more detail, one or more fields of a network packet associated with the incoming communication may be provided to a hash function to generate a hash key value that may be used as a flow key. In some embodiments, the TMC may include on or more special purpose processors that may generate the hash key value. Accordingly, in some embodiments, generating the hash key value may be very efficient and performant since it may be performed using a special purpose processor, such as, DFS 366, or the like.

At decision block 1108, in at least one of the various embodiments, if the flow key matches a name service key stored in a subscriber table, control may flow to block 1110; otherwise, control may be returned to a calling process.

At block 1010, in at least one of the various embodiments, the TMC may apply one or more traffic management policies to the network traffic associated with the match of the flow key and the name service key value. For example, subscriber information such as name service answer information may be used to select traffic management policies. In at least one of the various embodiments, the particular traffic management policies may be determined based on configuration information and/or one or more rule based policies implemented by the TMC.

Figure 12:
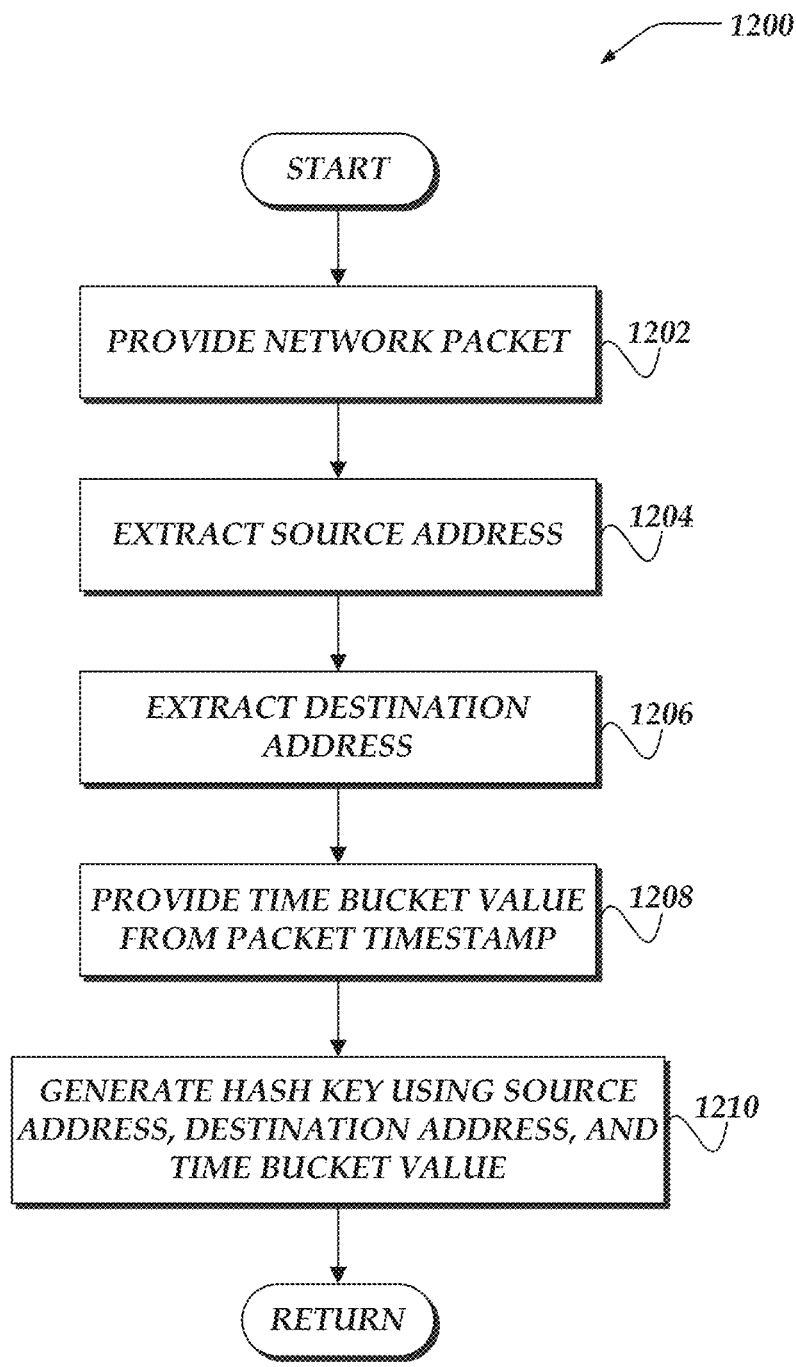
FIG. 12 illustrates an overview flowchart of a process for generating a hash key, in accordance with at least one of the various embodiments.

FIG. 12 illustrates an overview flowchart of process 1200 for generating a hash key, in accordance with at least one of the various embodiments. After a start block, at block 1202, in at least one of the various embodiments, one or more processors of the TMC may be provided one or more network packets that may be part of a network flow.

At block 1204, in at least one of the various embodiments, the source address information may be extracted from the one or more network packets. In at least one of the various embodiments, the TMC may be arranged to recognize the packet format of the network packet. For example, the TMC may be arranged to determine network protocols of the network flow based on configuration information, pattern matching, or the like, or combination thereof. Accordingly, the source address information, such as, an IP address of the sender, may be determined from the network packets.

At block 1206, in at least one of the various embodiments, the destination network address may be extracted from the one or more network packets. In at least one of the various embodiments, similar to determine a source network address, as described for block 1204, the destination address may be determined from the network packets of the network flow.

At block 1208, in at least one of the various embodiments, a time bucket value based on a timestamp that is associated with the network packet may be provided. As described above, a time bucket value may be based on a timestamp value that has some of its precision truncated. For example, if the timestamp is represented in binary, left shifting the timestamp value will reduce the precision of the timestamp and transform it into a time bucket value. The length of time represented by the time bucket value may be configured.

At block 1210, in at least one of the various embodiments, a hash key may be generated using the source address, destination address, and the time bucket value. In at least one of the various embodiments, hash key function is arranged such that connection flows that have the same source address, destination address, and time bucket value will have the same hash value key. Thus, in this example, if the time bucket value spans 15 seconds, connection flows having the same source and destination addresses that are observed in the 15 second span will have the same hash key value.

Also, in at least one of the various embodiments, if the network packets are going in the opposite direction, the source address and destination address may be swapped to generate the hash key value. Accordingly, network flow packets traveling in the 'send' direction may be matched to network flow packets traveling in the 'response' direction. In some embodiments, this avoids having to generate separate hash value keys for each direction for a network flow. Next, control may be returned to a calling process.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, one or more steps or blocks may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform some or all of the actions in one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing communication over a network with one or more traffic management computers (TMCs) that include one or more processors, wherein the one or more processors execute the method to perform actions, comprising:
    receive, by the one or more processors on the one or more TMCs, one or more name service replies from one or more name service computers;
    extract, by the one or more processors on the one or more TMCs, one or more tuple values from each name service reply received from one or more name service computers;
    provide, by the one or more processors on the one or more TMCs, a name service key for each received name service reply based on the one or more tuple values extracted from each received name service reply, wherein each name service key is stored in a subscriber table managed by the one or more TMCs, wherein the subscriber table associates each stored name service key with subscriber information;
    detect, by the one or more processors on the one or more TMCs, a new flow based on one or more characteristics of the new flow;
    provide, by the one or more processors on the one or more TMCs, a flow key that is based on one or more tuple values extracted from a network packet included with the new flow, wherein the flow key is stored in a connection table managed by the one or more TMCs;
    compare, by the one or more processors on the one or more TMCs, the flow key to each stored name service key;
    employ, by the one or more processors of the one or more TMCs, one or more affirmative results of the comparison to provide subscriber information associated with the new flow, wherein one or more traffic management policies that are associated with the subscriber information is applied to the new flow;
    receive, by the one or more processors on the one or more TMCs, a name service query from a computer;
    extract, by the one or more processors on the one or more TMCs, one or more values from the name service query;
    provide, by the one or more processors on the one or more TMCs, the name service key based on the one or more values extracted from the name service query; and
    store, by the one or more processor on the one or more TMCs, the name service key in the subscriber table.

2. The method of claim 1, wherein the one or more processors on the one or more TMCs are a single processor.

3. The method of claim 1, wherein a subset of the one or more processors are within a single TMC.

4. The method of claim 1, wherein providing the name service key further comprises:
    providing a time bucket value based on a timestamp that is associated with the name service reply; and
    ignoring the one or more affirmative results of the comparison for network packets that have a timestamp that is outside of the time bucket value.

5. The method of claim 1, wherein providing the name service key, further comprises:
    extracting a source address from the name service reply;
    extracting a destination address from the name service reply;
    providing a time bucket value from a time stamp associated with the name service reply; and
    generating a hash value that is a function of the source address, the destination address, and the time bucket value.

6. The method of claim 1, further comprising, provide, by the one or more processors of the one or more TMCs, the one or more affirmative results based on a match of the new flow key and one stored name service key.

7. One or more traffic management computers (TMCs) comprising:
    memory comprising programmed instructions stored in the memory; and
    one or more processors configured to be capable of executing the programmed instructions stored in the memory to perform operations, comprising:
        perform the operations to receive one or more name service replies from one or more name service computers;
        perform the operations to extract one or more tuple values from each name service reply received from the one or more name service computers;
        perform the operations to provide a name service key for each received name service reply based on the one or more tuple values extracted from each received name service reply, wherein each name service key is stored in a subscriber table managed by the one or more TMCs, wherein the subscriber table associates each stored name service key with subscriber information;
        perform the operations to detect a new flow based on one or more characteristics of the new flow;
        perform the operations to extract one or more values from a network packet that is associated with the new flow;
        perform the operations to provide, a flow key that is based on one or more tuple values extracted from a network packet included with the new flow, wherein the flow key is stored in a connection table managed by the one or more TMCs;
        perform the operations to compare the flow key to each stored name service key;
        perform the operations to employ one or more affirmative results of the comparison to provide subscriber information associated with the new flow, wherein one or more traffic management policies that are associated with the subscriber information is applied to the new flow;
        perform the operations to receive a name service query from a computer;
        perform the operations to extract one or more values from the name service query;
        perform the operations to provide the name service key based on the one or more values extracted from the name service query; and
        perform the operations to store the name service key in the subscriber table.

8. The one or more TMCs of claim 7, wherein the one or more processors are a single processor.

9. The one or more TMCs of claim 7, wherein a subset of the one or more processors are within a single TMC.

10. The one or more TMCs of claim 7, wherein performing operations to provide the name service key further comprises:
    providing a time bucket value based on a timestamp that is associated with the name service reply; and
    ignoring the one or more affirmative results of the comparison for network packets that have a timestamp that is outside of the time bucket value.

11. The one or more TMCs of claim 7, wherein performing operations to provide the name service key, further comprises:
- extracting a source address from the name service reply;
- extracting a destination address from the name service reply;
- providing a time bucket value from a time stamp associated with the name service reply; and
- generating a hash value that is a function of the source address, the destination address, and the time bucket value.

12. The one or more TMCs of claim 7, further comprising, perform operations to provide the one or more affirmative results based on a match of the new flow key and one stored name service key.

13. A processor readable non-transitory storage media that includes instructions for managing communication over a network, wherein executions of the instructions by one or more processors on a traffic management computer (TMC) perform operations, comprising:
- receiving one or more name service replies from one or more name service computers;
- extracting one or more tuple values from each name service reply received from the one or more name service computers;
- providing a name service key for each received name service reply based on the one or more tuple values extracted from each received name service reply, wherein each name service key is stored in a subscriber table managed by the one or more TMCs, wherein the subscriber table associates each stored name service key with subscriber information;
- detecting a new flow based on one or more characteristics of the new flow;
- extracting one or more values from a network packet that is associated with the new flow;
- providing a flow key that is based on one or more tuple values extracted from a network packet included with the new flow, wherein the flow key is stored in a connection table managed by the one or more TMCs;
- comparing the flow key to each stored name service key;
- employing one or more affirmative results of the comparison to provide subscriber information associated with the new flow, wherein one or more traffic management policies that are associated with the subscriber information is applied to the new flow
- receiving a name service query from a computer;
- extracting one or more values from the name service query;
- providing the name service key based on the one or more values extracted from the name service query; and
- storing the name service key in the subscriber table.

14. The processor readable non-transitory storage media of claim 13, wherein the one or more processors are a single processor.

15. The processor readable non-transitory storage media of claim 13, wherein a subset of the one or more processors are within a single TMC.

16. The processor readable non-transitory storage media of claim 13, wherein providing the name service key further comprises:
- providing a time bucket value based on a timestamp that is associated with the name service reply; and
- ignoring the one or more affirmative results of the comparison for network packets that have a timestamp that is outside of the time bucket value.

17. The processor readable non-transitory storage media of claim 13, wherein providing the name service key, further comprises:
- extracting a source address from the name service reply;
- extracting a destination address from the name service reply;
- providing a time bucket value from a time stamp associated with the name service reply; and
- generating a hash value that is a function of the source address, the destination address, and the time bucket value.

18. The processor readable non-transitory storage media of claim 13, further comprising, providing the one or more affirmative results based on a match of the new flow key and one stored name service key.

* * * * *